US010878342B2

(12) United States Patent
Chew

(10) Patent No.: US 10,878,342 B2
(45) Date of Patent: Dec. 29, 2020

(54) CLOUD ASSISTED MACHINE LEARNING

(71) Applicant: INTEL CORPORATION, Santa Clara, CA (US)

(72) Inventor: Yen Hsiang Chew, Georgetown (MY)

(73) Assignee: Intel Corporation, Santa Clara, CA (US)

(*) Notice: Subject to any disclaimer, the term of this patent is extended or adjusted under 35 U.S.C. 154(b) by 561 days.

(21) Appl. No.: 15/474,235

(22) Filed: Mar. 30, 2017

(65) Prior Publication Data
US 2018/0285767 A1 Oct. 4, 2018

(51) Int. Cl.
*G06F 15/16* (2006.01)
*G06N 20/00* (2019.01)
*H04L 29/08* (2006.01)
*H04L 12/24* (2006.01)
*G06N 3/08* (2006.01)
*G06N 5/00* (2006.01)
*G06N 20/10* (2019.01)
*G06N 7/00* (2006.01)

(52) U.S. Cl.
CPC ............. *G06N 20/00* (2019.01); *G06N 3/08* (2013.01); *H04L 41/142* (2013.01); *H04L 41/16* (2013.01); *H04L 67/10* (2013.01); *H04L 67/1097* (2013.01); *H04L 67/12* (2013.01); *H04L 67/28* (2013.01); *H04L 67/2833* (2013.01); *G06N 5/003* (2013.01); *G06N 7/005* (2013.01); *G06N 20/10* (2019.01)

(58) Field of Classification Search
CPC .................................. H04L 67/12; G06N 5/02
See application file for complete search history.

(56) References Cited

U.S. PATENT DOCUMENTS

| | | | | |
|---|---|---|---|---|
| 9,443,511 B2* | 9/2016 | Hwang | ................... | G10L 15/10 |
| 9,465,388 B1* | 10/2016 | Fairfield | .............. | G05D 1/0044 |
| 9,473,514 B1* | 10/2016 | Chou | ....................... | H04W 4/70 |
| 9,706,406 B1* | 7/2017 | Adams | .................. | H04W 12/08 |
| 10,223,751 B1* | 3/2019 | Hutchinson | ............ | G06Q 40/08 |
| 2009/0013177 A1* | 1/2009 | Lee' | ......................... | G06F 21/10 |
| | | | | 713/158 |

(Continued)

FOREIGN PATENT DOCUMENTS

| CN | 10201523240 A | 6/2012 |
|---|---|---|
| EP | 3032455 A1 | 12/2014 |
| WO | 2015081063 A1 | 6/2015 |

OTHER PUBLICATIONS

PCT International Search Report, PCT Application No. PCT/US2017/062276, dated May 3, 2018, 3 pages.

(Continued)

*Primary Examiner* — Hieu T Hoang
(74) *Attorney, Agent, or Firm* — Schwegman Lundberg & Woessner, P.A.

(57) ABSTRACT

A method for training an analytics engine hosted by an edge server device is provided. The method includes determining a classification for data in an analytics engine hosted by an edge server and computing a confidence level for the classification. The confidence level is compared to a threshold. The data is sent to a cloud server if the confidence level is less than the threshold. A reclassification is received from the cloud server and the analytics engine is trained based, at least in part, on the data and the reclassification.

35 Claims, 7 Drawing Sheets

(56) References Cited

U.S. PATENT DOCUMENTS

| | | | |
|---|---|---|---|
| 2010/0161161 A1* | 6/2010 | Lee | G06F 15/177 701/21 |
| 2010/0188328 A1* | 7/2010 | Dodge | G06F 3/0346 345/156 |
| 2011/0313958 A1* | 12/2011 | Roverso | G01W 1/00 706/12 |
| 2012/0136549 A1 | 5/2012 | Bradai et al. | |
| 2012/0314901 A1* | 12/2012 | Hanson | A61B 5/0077 382/103 |
| 2013/0238538 A1 | 9/2013 | Cook et al. | |
| 2013/0293217 A1 | 11/2013 | Moisee et al. | |
| 2014/0093131 A1* | 4/2014 | Fan | G06K 9/00671 382/104 |
| 2014/0129178 A1 | 5/2014 | Meduna et al. | |
| 2014/0149060 A1 | 5/2014 | Meduna et al. | |
| 2014/0189069 A1* | 7/2014 | Gero | H04L 67/2842 709/219 |
| 2014/0210625 A1* | 7/2014 | Nemat-Nasser | G08B 21/06 340/575 |
| 2014/0237277 A1* | 8/2014 | Mallinson | G06F 1/3293 713/323 |
| 2014/0244209 A1 | 8/2014 | Lee et al. | |
| 2014/0247206 A1* | 9/2014 | Grokop | G06F 1/3287 345/156 |
| 2014/0282945 A1* | 9/2014 | Smith | G06F 21/32 726/6 |
| 2014/0354527 A1 | 12/2014 | Chen et al. | |
| 2015/0019620 A1* | 1/2015 | Gidron | H04L 67/1097 709/203 |
| 2015/0134460 A1* | 5/2015 | Tian | G06Q 30/0251 705/14.66 |
| 2015/0185713 A1 | 7/2015 | Glickfield et al. | |
| 2015/0222477 A1* | 8/2015 | Ranjan | H04L 41/0631 709/223 |
| 2015/0317565 A1 | 11/2015 | Li et al. | |
| 2016/0063503 A1 | 3/2016 | Kobres et al. | |
| 2016/0088206 A1* | 3/2016 | Robinson | G06F 3/038 348/135 |
| 2016/0142868 A1* | 5/2016 | Kulkarni | H01Q 1/24 455/456.5 |
| 2016/0180197 A1* | 6/2016 | Kim | G01S 5/16 382/103 |
| 2016/0209818 A1 | 7/2016 | Mandle et al. | |
| 2017/0301213 A1* | 10/2017 | Davis | G08B 21/22 |
| 2018/0039956 A1* | 2/2018 | McElhinney | G06N 7/005 |
| 2018/0324540 A1* | 11/2018 | Liu | H04S 5/00 |

OTHER PUBLICATIONS

PCT International Search Report, PCT Application No. PCT/US2018/ 019882, dated Jun. 14, 2018, 3 pages.

Chew, Yen Hsiang, U.S. Appl. No. 15/392,360, filed in the USPTO Dec. 28, 2016, US Application, Drawings, and E-Ack Receipt attached 57 pages, not yet published.

* cited by examiner

300

CLOUD ASSISTED MACHINE LEARNING

TECHNICAL FIELD

The present techniques relate generally to relate to the Internet of Things (IoT). More specifically the present techniques relate to training local devices.

BACKGROUND

A current view of the Internet is the connection of clients, such as personal computers, tablets, smart phones, servers, digital photo-frames, and many other types of devices, to publicly-accessible data-centers hosted in server farms. However, this view represents a small portion of the overall usage of the globally-connected network. A very large number of connected resources currently exist, but are not publicly accessible. Examples include corporate networks, private organizational control networks, and monitoring networks spanning the globe, often using peer-to-peer relays for anonymity.

It has been estimated that the internet of things (IoT) may bring Internet connectivity to more than 15 billion devices by 2020. For organizations, IoT devices may provide opportunities for monitoring, tracking, or controlling other devices and items, including further IoT devices, other home and industrial devices, items in manufacturing and food production chains, and the like. The emergence of IoT networks has served as a catalyst for profound change in the evolution of the Internet. In the future, the Internet is likely to evolve from a primarily human-oriented utility to an infrastructure where humans may eventually be minority actors in an interconnected world of devices.

The initial rollout of IoT devices and networks into home, industrial, automotive, and other usages, has been highly verticalized. For example, individual vendors typically provide end-to-end solutions that involve highly integrated and, in many cases, fixed-function devices and groups of devices. Fixed-function devices may be constrained in computing power, memory, or other resources, limiting the adaptability of the IoT networks. New functional models for coordinating the use of dynamic and distributed resources may make IoT networks more adaptable.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
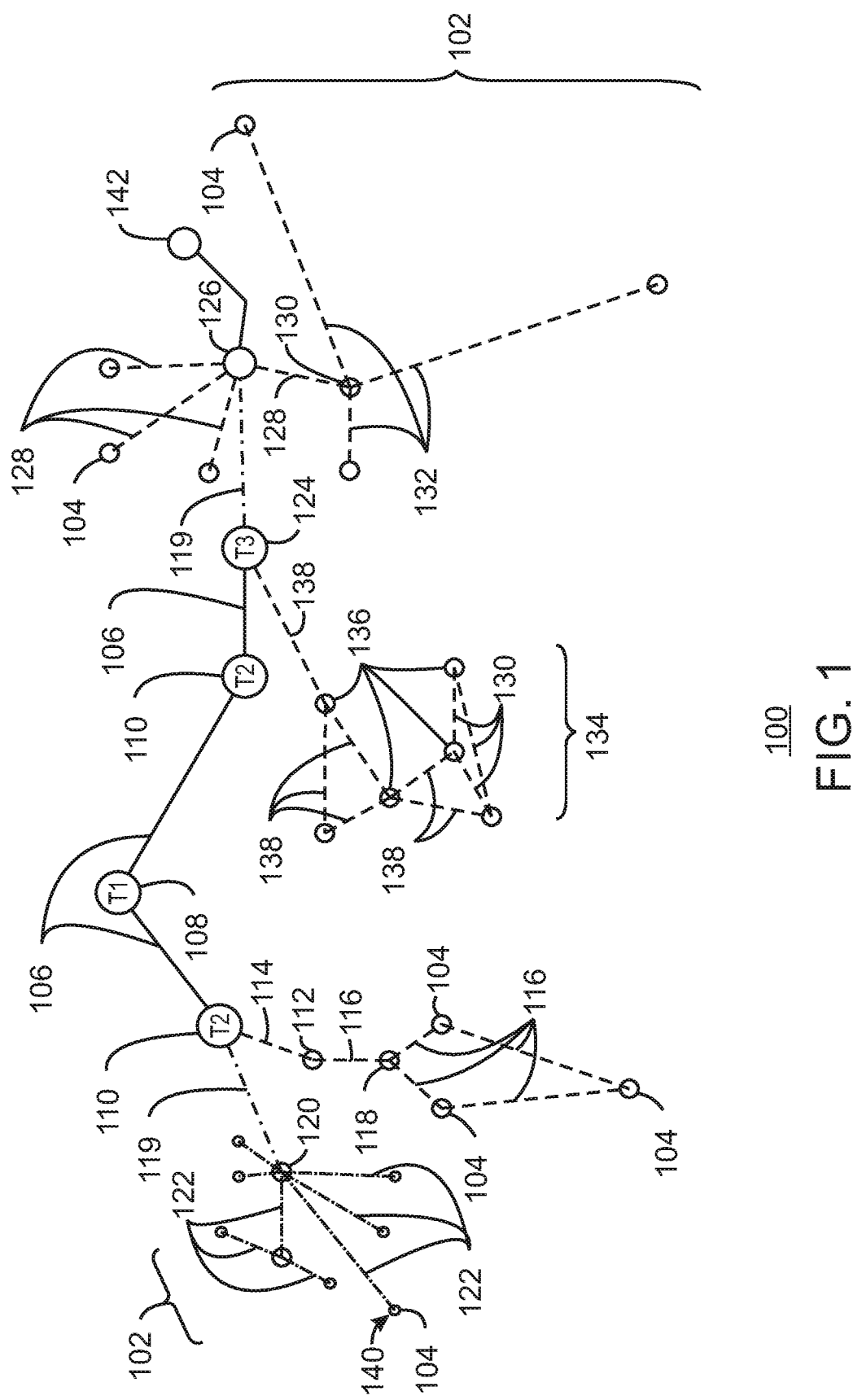
FIG. 1 is a drawing of interconnections that may be present between the Internet 100 and IoT networks in accordance with some embodiments.

In the following description, numerous details are set forth to provide a more thorough explanation of the present techniques. It will be apparent, however, to one skilled in the art, that the present techniques may be practiced without these specific details. In other instances, well-known structures and devices are shown in block diagram form, rather than in detail, to avoid obscuring the present techniques.

Many management and manageability models approach IoT with the traditional concepts of Data Center resource management. However, IoT presents several unique and complex resource and service interactions. For example, as described herein, classification of data may take place at an analytics engine, such as a perceptual computing analytics, a sensor data analytics, and the like. The analytics engine may be hosted by a server in a cloud, at edge processor, or both.

The disposition at the data, such as the analysis results, may be used by client devices to actuate an action, such as a change in media content, pushing content to a user's smart phone, alerting a customer representative, controlling traffic flow through an intersection, changing process control parameters, and the like. The analytics engine may pre-trained through supervised machine learning using a set of predefined training data, such as pre-classified images, data patterns, and the like.

An analytics engine hosted by a server may use a more powerful model then an edge server, allowing data to be classified using lower quality data. For example, the analytics engine may be trained using deep learning neural networks and a much larger set of training data. Further, the cloud server may have significantly higher computing power and storage capacity compared to an edge server, allowing the operation of more powerful models.

In addition, corporations may fund machine learning experts to continuously improve the performance of their cloud hosted analytics engine, for example, by improving the machine learning algorithms and by consistently feeding the analytics engine with new pre-classified training data. However, the latency of the transfer of the data from an IoT device to a cloud server and the transfer of the results back from the cloud server may slow the response time for an actuation.

An edge server hosted analytics engine may provide near real time actionable feedback to its connected clients because of network proximity to its client devices, for example, an edge server may be connected to client devices through a local area network (LAN) with minimal network hops, compared to a cloud server that is connected to client devices through a WAN with many network hops.

Although the latency may be decreased by using a local model in an edge device, for example, close to the actuation point, the local model may not be powerful enough to analyze every situation. Further, new training data used for supervised machine learning may not be as readily available to an analytics engine hosted by an edge server as compared to an analytics engine hosted by a cloud based server. For example, to retrain the analytics engine hosted by an edge server, a new set of training data must be pre-dispositioned or classified, such as by a machine learning expert, before it can be used to train the analytics engine. Providing the machine expert pre-classified training data to many edge servers that host analytics engine may not be commercially feasible.

The techniques described herein provide a method for an analytics engine hosted by a cloud based server to assist in training and analytics engine hosted by an edge server. This may improve the prediction accuracy of the analytics engine hosted by the edge server.

The techniques may be used in any number of analytics engines, for example, in perceptual computing analytics, anonymous video analytics (AVA), audience impression analytics independent software vendors (ISV), or edge server hosted analytics engine/artificial intelligence ISV, among others. These may include analytics engines that may be hosted by edge servers, such as Quividi, Intel AIM Suite, Seeing Machines, or AVA analytics engines designed using Intel RealSense, among others. Cloud based analytics service providers, such as Microsoft Cognitive Services, Google Cloud Vision API, Amazon Web Services, and the like, may benefit by utilizing the techniques to move part of the analytics workload from the cloud servers to analytics engines hosted by client or edge servers, such as Microsoft Cortana, Google Now, or Apple Siri, among others. In addition to commercial services, the techniques may be used within a corporate or government wide area network (WAN), for example, to train edge devices used for process control.

Any number of applications may take advantage of the training techniques to improve the accuracy of the predictions from analytics engines hosted by edge servers. Digital signage original equipment manufacturers (OEMs) and advertisement agencies may benefit from having a lower cost, more accurate and near real time anonymous video analytics (AVA) to track the behavior of viewers and customers. Other applications may include traffic flow analysis, as described herein, weather analysis, process control, and many others.

FIG. 1 is a drawing of interconnections that may be present between the Internet 100 and IoT networks in accordance with some embodiments. The interconnections may couple smaller networks 102, down to an individual IoT device 104, to the backbone 106 of the Internet 100. To simplify the drawing, not every IoT device 104, or other object, is labeled. The drawing may be used to illustrate the number of hops that may be needed to couple an IoT device 104 at the edge of the network to a server hosted by a backbone device.

In FIG. 1, top-level providers, which may be termed tier 1 ("T1") providers 108, are coupled by the backbone 106 of the Internet to other providers, such as secondary or tier 2 ("T2") providers 110. In some aspects, the backbone 106 can include optical fiber links. In one example, a T2 provider 110 may couple to a tower 112 of an LTE cellular network, for example, by wired links, optical links, microwave communications 114, or by other communications technologies. The tower 112 may couple to a mesh network including IoT devices 104 through an LTE communication link 116, for example, through a central node 118. The communications between the individual IoT devices 104 may also be based on LTE communication links 116.

In another example, a high-speed uplink 119 may couple a T2 provider 110 to a gateway 120. A number of IoT devices 104 may communicate with the gateway 120, and with each other through the gateway 120, for example, over Bluetooth low energy (BLE) links 122.

The backbone 106 may couple lower levels of service providers to the Internet, such as tier 3 ("T3") providers 124. A T3 provider 124 may be considered a general Internet service provider (ISP), for example, purchasing access to the backbone 106 from a T2 provider 110 and providing access to a corporate gateway 126 and other customers over a high-speed uplink 119.

From the corporate gateway 126, a wireless local area network (WLAN) can be used to communicate with IoT devices 104 through Wi-Fi® links 128. Wi-Fi links 128 may also be used to couple to a low power wide area (LPWA) gateway 130, which can communicate with IoT devices 104 over LPWA links 132, for example, compatible with the LoRaWan specification promulgated by the LoRa alliance.

The T3 provider 124 may also provide access to a mesh network 134 through a coordinator device 136 that communicates with the T3 provider 124 using any number of communications links, such as an LTE cellular link, an LPWA link, or a link 138 based on the IEEE 802.15.4 standard, such as Zigbee®. Other coordinator devices 136 may provide a chain of links that forms cluster tree of linked devices.

In some aspects, one or more IoT devices 104 include the appropriate transceiver for the communications with other devices. Further, one or more IoT devices 104 may include other radio, optical, or acoustic transceivers, as well as wired network interfaces, for communications using additional protocols and frequencies.

In this example, one of the IoT devices 104 may be an edge device 140 that uses an analytics engine to classify data, such as determining gender, age, or emotions, among other parameters, for a viewer of a sign. The corporate gateway 126 may provide access to a cloud server 142 that hosts an analytics engine that may be used for the classification. However, the number of hops between the edge device 140 and the cloud server 142 may introduce latency that makes the edge device 140 slow to respond to a viewer. The analytics engine hosted by the edge device 140 may classify the data, allowing for faster response time, but may be less accurate.

As described herein, the analytics engine hosted by the edge device 140 may determine that it cannot classify a piece of data, and send that data to the cloud server 142 for further analysis. The analytics engine hosted by the cloud server 142 may then return the classification to the edge device 140 for action. The analytics engine hosted by the edge device 140 may then use the classification from the cloud server 142, and the data provided, to further train the analytics engine hosted by the edge device 140. Over time, the analytics engine hosted by the edge device 140 may need to obtain less input from the analytics engine hosted by the cloud server 142.

In some examples, the analytics engine hosted by the edge device 140 may send the data to the cloud server 142 along with a unique identification code. The cloud server 142 may then return the classification and the identification code, but not return the data. In this example, the edge device 140 may store or buffer the data along with the identification code. When the edge device 140 receives the classification and the identification code from the cloud server 142 it may then access the associated data for further training of the analytics engine as the accuracy of the local predictions improve.

Figure 2:
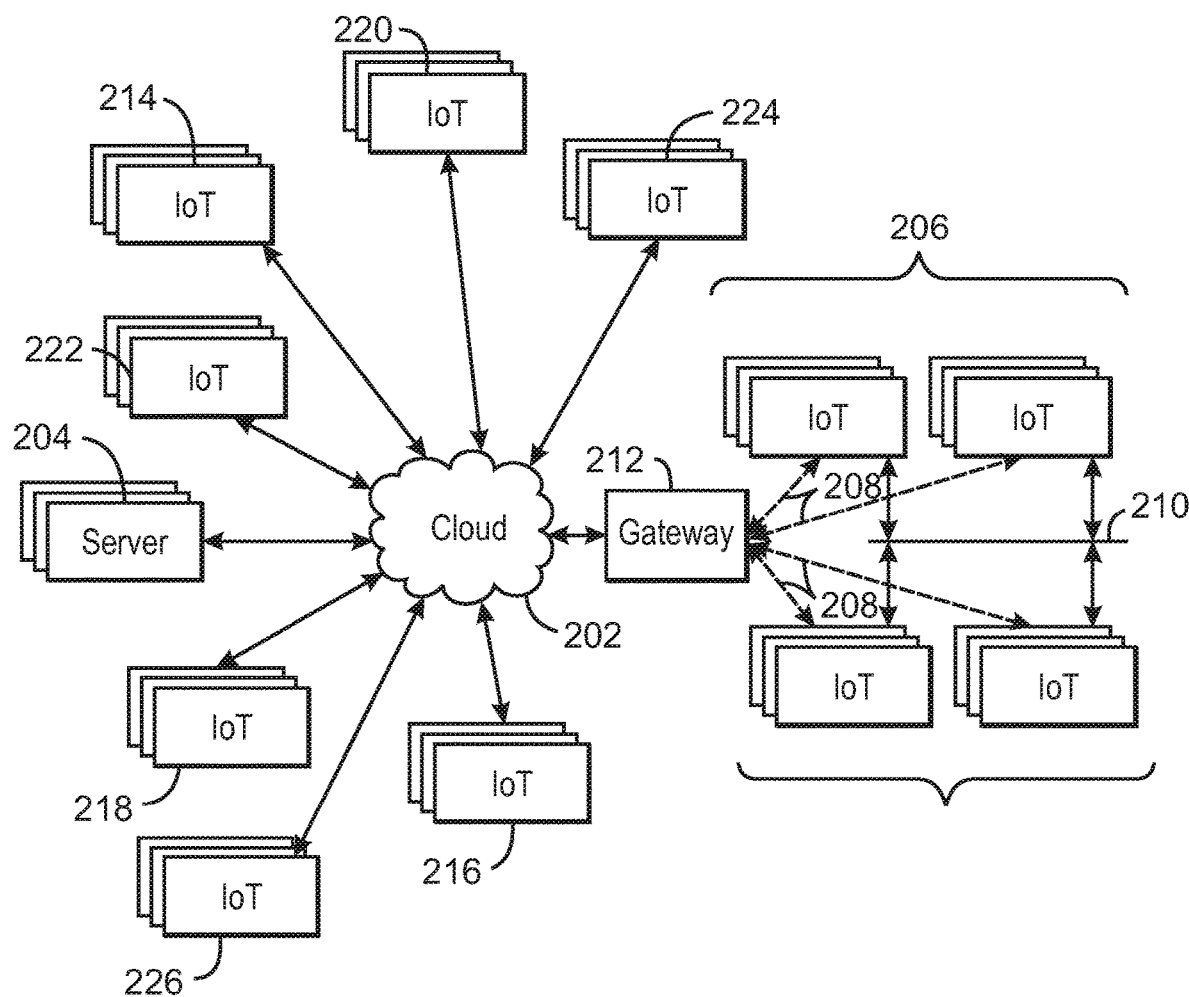
FIG. 2 is a drawing of a compute network in which a cloud is in communication with a number of Internet of Things (IoT) devices in accordance with some embodiments.

FIG. 2 is a drawing of a compute network 200 in which a cloud 202 is in communication with a number of Internet of Things (IoT) devices in accordance with some embodiments. The cloud 202 may represent the Internet, or may be a local area network (LAN), or a wide area network (WAN), such as a proprietary network for a company. The IoT devices may include any number of different types of devices, grouped in various combinations. Cloud servers 204 may couple to the cloud 202 to provide data, analytics services, and the like to IoT devices, for example, from analytics engines hosted by the cloud servers 204.

In this example, a traffic control group 206 may include IoT devices along streets in a city. These IoT devices may include stoplights, traffic flow monitors, cameras, weather sensors, and the like. The traffic control group 206, or other subgroups, may be in communication with the cloud 202 through wireless links 208, such as LPWA links, and the like. Further, a sub-network 210, using wired or wireless links, may allow the IoT devices to communicate with each other, such as through a local area network, a wireless local area network, and the like.

The IoT devices may use another device, such as a gateway 212 to communicate with the cloud 202. In some examples, the sub-network 210 may couple one or more of the IoT devices to the gateway 212 using a wired connection. Any of the IoT devices, or the gateway 212, may host an analytics engine for the analysis of data from the IoT devices. If the gateway 212 hosts the analytics engine, it may provide classification and other services to a number of the IoT devices, for example, providing traffic flow predictions to the IoT devices in the traffic control group 206.

Although wireless networks and wired networks are described, it may be noted that any type of network may be used to couple the devices to each other or to the gateway 212. A network or assembled group of devices may have both wired and wireless connections, and may use both simultaneously between nodes, peers, and gateway devices. Further the network or assembled group of devices may use wired networks, wireless networks, or both, to communicate with the cloud, and any higher performance computing devices that may be participating to deliver services or support to what is disclosed herein.

Other groups of IoT devices may include remote weather stations 214, local information kiosks 216, alarm systems 218, automated teller machines 220, alarm panels 222, or moving vehicles, such as emergency vehicles 224, other vehicles 226, or personal devices, such as smart phones, among many others. Each of these IoT devices may be in communication with other IoT devices, with data centers, including cloud servers 204, or both.

In an example, an analytics engine may be hosted by the gateway 212 to provide classification and prediction services to the IoT devices in the traffic control group 206. As traffic approaches intersections controlled by IoT devices in the traffic control group 206, the analytics engine may predict how long it will take for a particular vehicle to reach a light, how long the light should be green, when the light should turn red, and other items, such as how long it will take a pedestrian to cross a street. These predictions may then be used to control lights by the IoT devices in the traffic control group 206.

If the analytics engine in the gateway 212 determines that it cannot accurately predict a timing value, it may send the data from the gateway 212 to an analytics engine hosted by a cloud server 204, along with an identification code. The cloud server 204 may then perform the prediction in the analytics engine it hosts, and return the prediction and the identification code to the gateway 212. The gateway 212 may then pass the prediction to the IoT devices in the traffic control group 206 for actuation of controls, such as changing lights from red to green. Further, the gateway 212 may access the data associated with the identification code and use that to train the analytics engine the gateway 212 is hosting.

Accordingly, the analytics engine hosted by the cloud server 204 may be used to proactively train an analytics engine hosted by the edge server to increase the prediction accuracies. This allows the implementation of a more economical client or edge hosted machine learning analytics engine that has increasing prediction accuracies and near real-time actionable items feedback. For the traffic control group 206, the increasing prediction accuracies may improve traffic flow through the intersection over time.

As another example, IoT devices in a group, such as at a mall or airport, may be active signs that determine when a user is viewing the sign. An independent software vendor (ISV) may implement an anonymous video analysis (AVA) algorithm on a gateway, one or more of the active signs, or on another edge server, and utilize the services of a cloud analytics solution provider, for example, hosted by one of the cloud servers 204, to progressively train the AVA analytics algorithm.

Since some cloud analytics solution providers charge customers based on the number of enquiries made to their cloud hosted analytics engine, the ISV may decrease costs by using the cloud hosted analytics engine as a machine training tool to enhance the prediction accuracies of the analytics engine hosted by the edge server.

The techniques provide a method to enable an analytics engine hosted by cloud server to train a less powerful analytics engine hosted by an edge server. As described herein, the performance or prediction accuracy, of the analytics engine hosted by the edge server may progressively improve and converge towards the prediction accuracy of the analytics engine hosted by the cloud server. Thus, over time, most of the predictions will be made by a local edge server rather than the cloud analytics provider.

Further, the training process is automated, lowering the need for a machine learning expert to train the client. This also allows the scaling of the training across a cluster of client or analytics engines hosted by edge servers. For example, one cloud hosted analytics engine may automatically train any number of edge server hosted analytics engines across different regions of the world. Training of the edge server hosted analytics engines may not be commercially feasible if the training were to be manually performed by machine learning experts.

The techniques are applicable for training any client or analytics engine hosted by an edge server irrespective of how the analytics algorithm is implemented, so long as the analytics engine assigns a confidence level to its predictions. A machine learning algorithm may they be used with the data and the classification received from an analytics engine hosted on the cloud server to optimize its performance.

As can be seen from FIG. 2, a large number of IoT devices may be communicating through the cloud 202. This may allow different IoT devices to request or provide information to other devices autonomously. For example, the traffic control group 206 may request a current weather forecast from a group of remote weather stations 214, which may provide the forecast without human intervention.

Clusters of IoT devices, such as the remote weather stations 214 or the traffic control group 206, groups of active signs, and the like, may be equipped to communicate with other IoT devices as well as with the cloud 202. This may allow the IoT devices to form a cluster of devices, allowing them to function as a single device, which may be termed a fog device. The fog device is discussed further with respect to FIG. 2.

Figure 3:
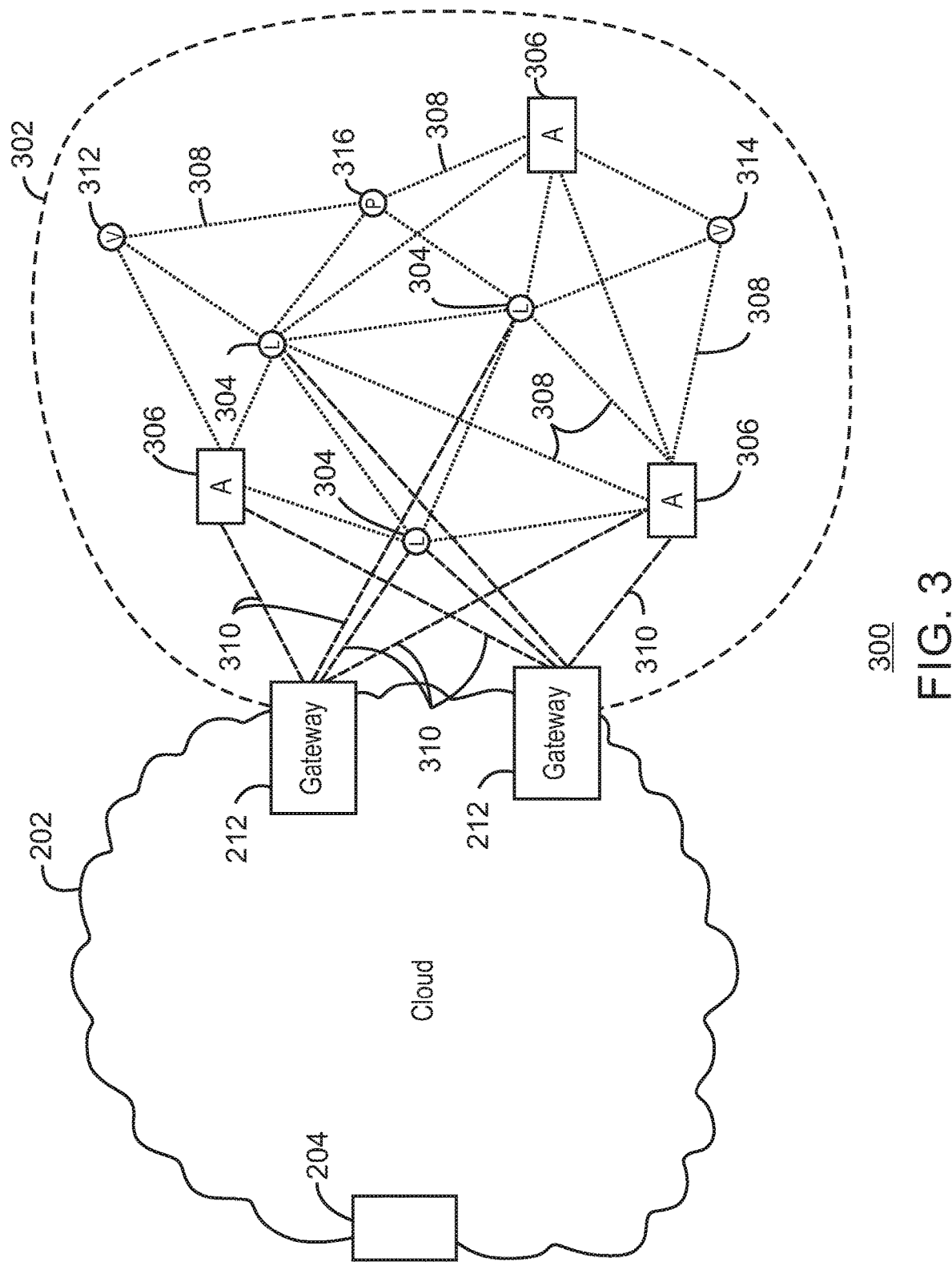
FIG. 3 is a drawing of a computing network, in which the cloud is in communication with a mesh network of IoT devices, which may be termed a fog device, operating at the edge of the cloud in accordance with some embodiments.

FIG. 3 is a drawing of a computing network 300, in which the cloud 202 is in communication with a mesh network of IoT devices, which may be termed a fog device 302, operating at the edge of the cloud 202 in accordance with some embodiments. Like numbered items are as described with respect to FIG. 2. As used herein, a fog device 302 is a cluster of devices that may be grouped to perform a specific function, such as providing content to active signs, traffic control, weather control, plant control, home monitoring, and the like.

Objects, such as the IoT devices, may interact to accomplish a larger function, goal or workflow, for example, to form the fog device 302. Objects may be identified in terms of their type, e.g., the function performed, and instance, e.g., presence. Multiple object instances may have the same type identity, but may have unique instance identities. Further, multiple object instances may be organized into groups where an instance of the grouping may have an identity. A group of objects that interact in a particular way, given their type, for example, function, state and interface semantics, may represent a composite object. The composition itself may have a type and instance abstraction. Hence, composite objects follow the same identity rules as atomic objects. Composition with type and instance properties allows object extensibility through composition.

The object may last as long as a single device, such as a refrigerator, or only until a current function is completed. For example, a refrigerator may be regarded as a composite object, or fog device 302, consisting of multiple other objects, such as a light, a compressor, a temperature sensor, a thermostat, a water dispenser, an ice maker, and the like. The other objects may each be atomic, or may themselves be composite objects. For example, an ice maker may be a composite object formed from atomic objects, such as a temperature sensor, a thermostat, a solenoid-operated water valve, a timer, an ice tray, and the like. An example of a virtual composite object, or fog device 302, made up of a number of physical devices is the intersection and the emergency cluster, described herein. Another example of a virtual composite object, or fog device 302, may include active signs located in a general area, such as an airport, or a mall, among others.

Accordingly, object identity may be understood in context of three abstractions: object instance, object type, and meta-identity. An object instance is a computational element that occupies finite resources, such as memory, CPU, bandwidth, status, and the like. Object instantiation has a lifecycle that involves creation, mutation, and deletion. An object type is a logical construct that declares expected or possible behavior, states, and composition. The object type can place constraints on how objects behave and interact when instantiated. The object type can also indicate the types of requests the object can respond to, for example, the interface.

Meta-identity is a way of defining a meta-data context in which the object may exist. An object may not be aware of encapsulating meta-identity. Object instances may dynamically apply stereotyping information by defining a group having desired meta-data context then enrolling the object into the group.

Authentication and identity are collated issues. An object identity cannot be believed if not authenticated. However, authentication without identity has limited utility. Asymmetric key signing, such as ECDSA (Elliptic Curve Digital Signature Algorithm), RSA, or the like, is useful for authentication under the expectation that the ability to replicate and distribute the private key is restricted. The use of the key establishes proof a principal or agent has access to the key though restricted. Hence, the principal or agent must be authentic.

The semantics of authentication, when applied to object identities, also follows the three abstractions of object instance, object type, and meta-identity. For an object instance, the authentication challenge-response establishes that the current interaction can only be with a particular instantiation of the object. For an object type, the authentication challenge-response attests that the current interaction is constrained by the semantics of type identification. For the meta-identity, the authentication challenge-response categorizes the current interaction according to the defined context.

Blockchains may be used to provide the information both for authentication and for formation of the devices. Blockchains may be used to decentralize identification as they may provide agreement between devices regarding names and identities that are in current use. As used herein, a blockchain is a distributed database of identity records that is made up of data structure blocks. Further, as used herein, the term blockchain may include any one or more of other distributed ledger systems. Other distributed ledger approaches include Ripple, Hyperledger, Multichain, Keyless Signature Infrastructure, and the like. Each data structure block is based on a transaction, where the issuance of a new name to a device, composite device, or virtual device is one example of a transaction.

Using blockchains for identification, impersonation may be detected by observing re-issuance of names and identities without a corresponding termination. Public blockchains may be most useful, as they can enable a diverse community of observers to detect misnaming, malicious naming, or failure of a naming infrastructure. Thus, trustworthy identity infrastructure may be central to trusting IoT networks.

Although the fog device 302 is this example is shown as being made up of devices in a single location, fog devices can include devices in multiple locations, formed to provide specific services. For example, the fog device 302 may include remote weather stations located in the cloud 202. Further, a server 204 located in a data center may be included in the fog device 302 for data classification and predictions using an analytics engine, and other services. The formation of the fog device 302 may be as simple as sharing naming, type, and identification information, for example, group identity credentials, between the different devices forming the fog device.

The fog device 302 is not limited to direct communications between each of the devices as shown in FIG. 3. For example, the fog device 302 may have the individual IoT devices coupled through a single wired or wireless network to the gateways 212.

In the example of FIG. 3, the fog device 302 includes a group of IoT devices at a traffic intersection. The fog device 302 may be established using the specifications released by the OpenFog Consortium (OFC), among others. These specifications allow the formation of a hierarchy of computing elements between the gateways 212 coupling the fog device 302 to the cloud 202 and to endpoint devices, such as traffic lights 304 and data aggregators 306, in this example. The fog device 302 can leverage the combined processing and network resources that the collective of IoT devices provides. Accordingly, a fog device 302 may be used for any number of applications including, for example, control of active signs, plant control, financial modeling, weather forecasting, traffic analyses, and the like.

For example, traffic flow through the intersection may be controlled by a traffic lights 304. Analysis of the traffic flow and control schemes may be implemented by analytics engines hosted by data aggregators 306 that are in communication with the traffic lights 304 and each other. In some examples, the implementation of the traffic flow applications may take place in analytics engines hosted by the traffic lights 304 themselves. Data may be uploaded to the cloud 202, and commands received from the cloud 202, through the gateways 212, which are in communication with the traffic lights 304 and the data aggregators 306. Remote devices in the cloud 202, such as the cloud servers 204, weather stations, and the like, which are joined to the fog device 302 may be accessed through the gateways 212.

As indicated in this example, a hierarchy of analytics engines may be implemented, wherein each higher-level analytics engine may be used to train a lower level analytics engine. For example, a traffic light 304 may include a simple analytics engine to predict the time that an approaching vehicle will take to reach the traffic light 304. If the traffic light 304 is incapable of making the prediction with a sufficient level of confidence, for example, greater than 80%, 90%, 95%, or higher, the traffic light 304 may send the data and an identification code to a nearby data aggregator 306 for further classification.

The data aggregator 306 may then return the prediction and the identification code to the traffic light 304. The traffic light 304 may then perform the actuation indicated by the prediction and use the data sent to the data aggregator 306 and the prediction from the data aggregator 306 to train the model to increase the prediction accuracy.

Similarly, if the data aggregator 306 is not capable of making the prediction with a sufficient level of confidence, e.g., higher than the threshold, it may send the data and an identification code to an analytics engine hosted by a cloud server 204. The level of confidence may depend upon the application being run. For example, a confidence level of greater than about 99.9%, or higher, may be used for predicting when to change traffic lights from red to green. In comparison, a confidence level of a gender prediction made by an AVA system from an image of a viewer may be sufficient at about 60%, 70%, 80%, or higher.

The data aggregator 306 may save or buffer the data the data sent to the analytics engine hosted by the cloud server 204, which is associated with the identification code. The analytics engine hosted by the cloud server 204 may make the prediction and return the prediction along with the identification code to the data aggregator 306. The data aggregator 306 may then pass the prediction and the identification code to a traffic light 304 for performance of an action. The data aggregator 306 may also access the data associated with the identification code and use that in a machine learning process with the prediction returned by the cloud server 204 to retrain the analytics engine hosted by the data aggregator 306. The machine learning process may be a regression analysis in the data aggregator 306, or may include any number of other machine learning techniques, including, for example, a neural network, a decision tree, a support vector machine (SVM), a Bayesian predictor, and the like.

Further, the identification code and prediction sent to the traffic light 304 may be used by the traffic light to train a lower level analytics engine hosted by the traffic light 304. This may provide a hierarchy of analytics engines, where each of the analytics engines is located more closely to the point of use of the data. In each case, a confidence level calculated by the analytics engine may determine if a prediction is accepted, or if the data and an identification code is passed to a next higher analytics engine.

Any number of communications links may be used in the fog device 302 for communications with local devices. Shorter-range links 308, for example, compatible with IEEE 802.15.4 may provide local communications between IoT devices that are proximate to the intersection. Longer-range links 310, for example, compatible with LPWA standards, may provide communications between the IoT devices and the gateways 212. To simplify the diagram, not every communication link 308 or 310 is labeled with a reference number. In addition to radio communication links, wireless links may be used between a portion of the IoT devices, the gateways 212, or any combinations thereof.

The fog device 302 may be considered to be a massively interconnected network wherein a number of IoT devices, and other devices, are in communications with each other, for example, by the communication links 308 and 310, and through the gateways 212. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen alliance, the optimized link state routing (OLSR) Protocol, or the better approach to mobile ad-hoc networking (B.A.T.M.A.N.), among many others. As described herein, the CSI provides a networking communication and protocol that may be used to establish the fog device 302.

In some aspects, communications from one IoT device may be passed along the most convenient path to reach the gateways 212, for example, the path having the fewest number of intermediate hops, or the highest bandwidth, among others. In these networks, the number of interconnections provides substantial redundancy, allowing communications to be maintained, even with the loss of a number of IoT devices.

In some aspects, the fog device 302 can include temporary IoT devices. In other words, some of the IoT devices may not be permanent members of the fog device 302. In the example in the drawing 300, three transient IoT devices have joined the fog device 302, a first vehicle 312, a second vehicle 314, and a pedestrian 316. In these cases, the IoT device may be built into the vehicles 312 and 314, or may be an app on a smart phone carried by the pedestrian 316. Other IoT devices may also be present, such as IoT devices in bicycle computers, motorcycle computers, drones, and the like. Further, services located in data centers, such as analytics engines used to perform traffic analysis services, may be joined to the fog device 302 on a temporary or permanent basis.

As described herein, the applications controlling the fog device may operate at any number of levels depending on a number of factors, such as the purpose of each device and the loading on the systems. For example, the traffic lights 304 may monitor sensors to identify approaching traffic, such as vehicles, pedestrians, bicycles, and the like, to implement a traffic control application. The sensors may be cameras that capture streaming video of the roadways and pass the streaming video to the traffic lights 304 for analysis. Under normal operations, the traffic lights 304 may cooperate with each other to determine which roadways have green lights and which roadways have red lights.

However, during periods when traffic is particularly heavy the traffic lights 304 may be overloaded. Accordingly, the analysis of the traffic may be shifted to the data aggregators 306, or the gateways 212. Further, portions of the analysis may be shifted to other devices in contact with the traffic lights 304 as part of the fog device 302, such as the vehicles 312 and 314, depending on the level of confidence of the prediction, contact time, vehicle 312 or 314 capability, and the like. Once the loading returns to normal, the analysis may be shifted back to the traffic lights 304.

The fog device 302 formed from the IoT devices may be presented to clients in the cloud 202, such as the server 204, as a single device located at the edge of the cloud 202. In this example, the control communications to specific resources in the fog device 302 may occur without identifying any specific IoT device within the fog device 302. Accordingly, if one IoT device within the fog device 302 fails, other IoT devices in the fog device 302 may be able to discover and control a resource, such as an actuator, or other device attached to an IoT device. For example, the traffic lights 304 may be wired to allow any one of the traffic lights 304 to control lights for the other traffic lights 304. The data aggregators 306 may also provide redundancy in the control of the traffic lights 304 and other functions of the fog device 302. For example, the data aggregators 306 may share the analytics engine and parameters to allow any data aggregator 306 to operate the analytics engine if other data aggregators fail.

In some examples, the IoT devices may be configured using an imperative programming style, e.g., with each IoT device having a specific function and communication partners. However, the IoT devices forming the fog device 302 may be configured in a declarative programming style, allowing the IoT devices to reconfigure their operations and communications, such as to determine needed resources in response to conditions, queries, and device failures. This may be performed as transient IoT devices, such as the pedestrian 316, join the fog device 302. It may be noted the pedestrian 316 would join the group through a device, such as a smartphone or fitness monitor, worn or carried by the pedestrian 316. If the pedestrian 316 does not have a device, they will be monitored by the other devices in the fog device 302.

A combination of IoT devices using an imperative programming style and devices declarative programming style may be used in applications. For example, more general purpose IoT devices may have the power to operate a declarative programming style to adapt to conditions that are changing. More constrained IoT devices, such as sensor devices, may not have the programming power to include more adaptive software. Similarly, the level of model or analytics engine, if present, may be controlled by the constraints of the device. A data aggregator 306 may have sufficient computing power, for example, running a multi-core processor, to operate an advanced analytics engine, for example, including a multi-variant regression model, a neural network, and the like. In contrast, a traffic light 304 may only have the power to operate a simple regression model.

As the pedestrian 316 is likely to travel more slowly than the vehicles 312 and 314, the fog device 302 may use an analytics engine to predict when the pedestrian 316 is expected to transit the intersection. This may be performed by a data aggregator 306 running a model using data provided by the pedestrian 316 and the traffic lights 304. If the level of confidence in the prediction is not higher than a threshold, the data aggregator 306 may send the data to a cloud server 204, while instructing the lights to stay green until the pedestrian 316 has been sensed at the other side, or a more accurate prediction is received. If the level of confidence is sufficiently high, the data aggregator 306 may instruct a light to turn yellow while the pedestrian 316 is still in a crosswalk, with sufficient time to turn red as the pedestrian steps onto the opposite curb.

As the transient devices 312, 314, and 316, leave the vicinity of the intersection the fog device 302, the fog device 302 may reconfigure itself to eliminate those IoT devices from the network. Any micro-services temporarily in use for controlling the intersection as the transient devices 312, 314, and 316, pass-through may be deactivated or shifted to other devices. As other transient IoT devices approach the intersection, the fog device 302 may reconfigure itself to include those devices.

The fog device 302 may include the traffic lights 304 for a number of intersections, such as along a street, along with all of the transient IoT devices along the street. The fog device 302 may then divide itself into functional units, such as the traffic lights 304 and other IoT devices proximate to a single intersection. This type of combination may enable the formation of larger IoT constructs, e.g., groups of IoT devices that perform a particular function in the fog device 302.

For example, if an emergency vehicle joins the fog device 302, an emergency construct, or virtual device, may be created that includes all of the traffic lights for the street. The IoT devices of the emergency construct may access and download micro-services for controlling the traffic lights along the street. The emergency construct may include a number of micro-services activated from a task image repository in the fog device 302, or downloaded to the fog device 302 from the server 304 or other devices in the cloud 302. Further, the task images may be downloaded from an emergency vehicle that joins the fog device 302.

The emergency construct may use the deployed workloads to determine the location and roadway for the emergency vehicle. The workloads may then instruct the traffic lights 304 along the street to stay red for opposing traffic and green for the emergency vehicle, expediting the passage of the emergency vehicle. In this example, the analytics engine may be used to predict that the cross traffic may safely stop before the emergency vehicle reaches an intersection. If not, the analytics engine may inform the emergency vehicle of the risk of a collision.

As illustrated by the fog device 302, the organic evolution of IoT networks is central to improving or maximizing the utility, availability and resiliency of IoT implementations. The use of applications that are shifted to different computing devices may increase the adaptability of the fog device 302, for example, providing easier incorporations of new functions.

Figure 4:
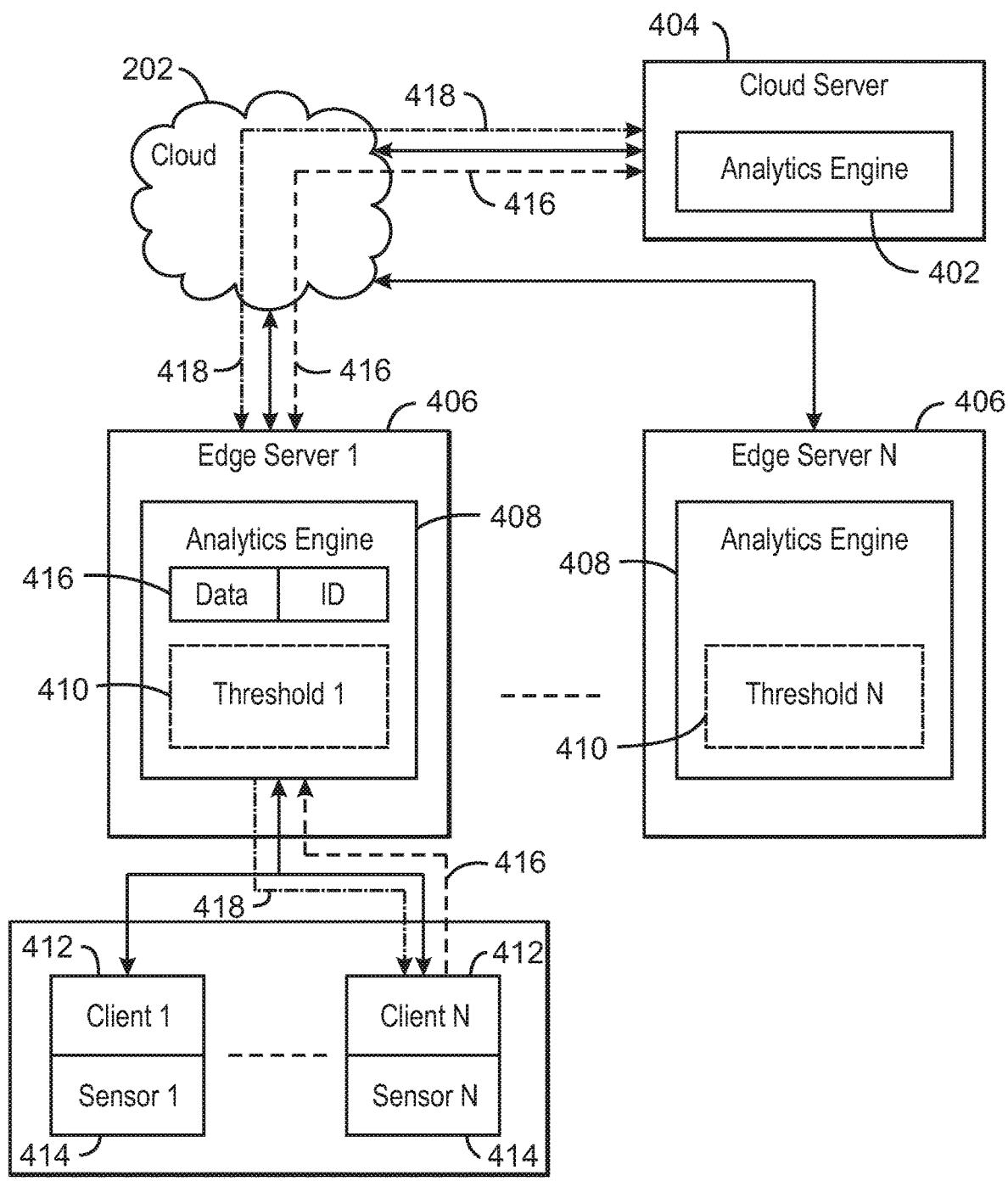
FIG. 4 is a schematic diagram of edge server devices that include analytics engines that may be trained by an analytics engine in a cloud server in accordance with some embodiments.

FIG. 4 is a schematic diagram 400 of edge server devices that include analytics engines that may be trained by an analytics engine 402 in a cloud server 404 in accordance with some embodiments. The data used for training the analytics algorithm by machine learning may be properly dispositioned, e.g., classified, prior to training. At the highest level, for example, for the analytics engine 402 hosted by the cloud server 404, the classification may be manually performed, such as by a machine learning expert. For example, for an AVA analysis, the machine learning expert may identify features of images, such as age, gender, emotion, formality of dress, and the like. The cloud hosted analytics engine may be well-trained and optimized for relatively high prediction accuracies.

Edge servers 406 may each host a local analytics engine 408. The local analytics engine 408 may be manually deployed to the edge server 406, for example, when the edge server 406 is deployed into an application. In some examples, however, the edge servers 406 may request that an analytics engine be downloaded from a micro services provider. The analytics engine may be selected based on the capabilities of the edge servers 406. Both the cloud hosted and the edge server hosted analytics engines may assign a confidence level to each classification category. For example, for an image of a viewer of a sign, the classification categories may include emotions, gender, age group, facial expression, pose, object/face matching, and the like. Each of the local analytics engines 408 may include a classification threshold 410 for comparison with the calculated confidence level, as used herein.

The edge server 406 may provide services to group of clients 412. The analytics engine 408 hosted by the edge server 406 utilizes machine learning with training data to train its prediction algorithms. The clients 412 may include sensors 414, such as traffic sensors, video cameras, motion sensors, and the like. The data 416 from the clients 412 may be provided to the analytics engine 408 in the edge server 406 for classification. The classification may include predictions of events based on the data, or features of the data, such as gender, emotion, or age, for an image taken by camera at an active sign.

If the analytics engine 408 is unable to classify the data with a higher confidence level than the classification threshold 410, the data 416 and an identification code may be sent through the cloud 202 to the cloud server 404 for reclassification. In some examples, the comparison may be a between a user set threshold and a weighted average confidence level of a user defined subset of analytics subject categories, assigned by the first edge server hosted analytics engine.

If the reclassified results at the analytics engine 402 hosted by the cloud server 404 have a confidence level that exceeds a user predetermined cloud threshold, the classification may be returned. The cloud threshold for the confidence level used by the analytics engine 402 in the cloud server 404 may be the same as the local threshold used by the edge server. In some examples, the cloud threshold may be higher than the local threshold, as the analytics engine 402 hosted by the cloud server 404 may be more accurate.

In some examples, the sensor data and its associated re-classification results may be sent back to edge server hosted analytics engine. Alternatively, to save bandwidth, only the classification 418 of the data 416, along with the identification code, may be returned to the edge server 406. The edge server 406 may then use the identification code (ID) to access the data 416 from a buffer. The classification 418 and the data 416 to retrain its machine learning algorithm to improve prediction accuracy. The classification 418 may also be sent to the client 412 to be used for actuation, training of a client model, or both.

In some examples, training the machine learning algorithm may include optimizing a cost function, for example, minimizing or maximizing the function, associated with a prediction function for an analytics engine. The reclassified data and its associated classification, as received from the cloud hosted analytics engine, may be included as a contributor to the cost function. In some examples, a single cloud analytics engine may function as a cloud hosted "sensor data re-classification engine" used to remotely train multiple client or edge server hosted analytics engines.

The threshold 410 is not limited to a single value, as multiple thresholds may be used. For example, if the confidence level is below a lower threshold, such as 30%, 20%, 10%, or lower, it may indicate that the data does not include a feature, for example, indicating that a face is not recognized in an image. Below the lower threshold, the data may be discarded. As values for the confidence level that are above an upper threshold may be definitively classified, only data corresponding to confidence levels between the upper and lower thresholds may be sent to a cloud server for reclassification.

Figure 5:
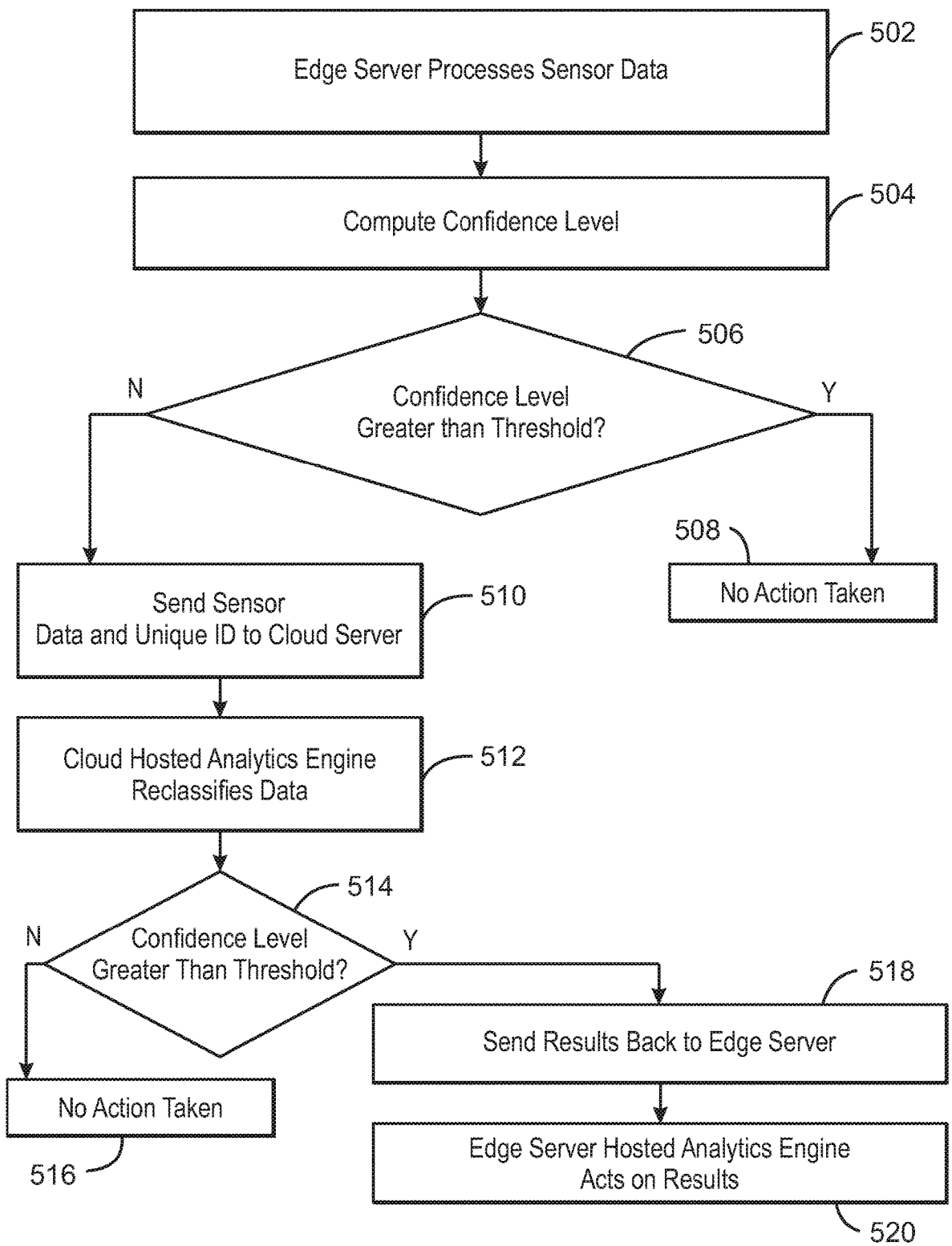
FIG. 5 is a process flow diagram of an example of a method to train and analytics engine hosted by an edge server under the supervision of an analytics engine hosted by a cloud server in accordance with some embodiments.

FIG. 5 is a process flow diagram of an example of a method 500 to train and analytics engine hosted by an edge server under the supervision of an analytics engine hosted by a cloud server in accordance with some embodiments. The method begins at block 502 when an edge server processes sensor data. As described herein, the edge server may directly collect the data or may provide analysis services to one or more other devices.

In processing the sensor data, the edge server may use an analytics engine the classify the sensor data into subject categories. For example, if the sensor is a camera that collects an image of a viewer of a sign, the analytics engine may classify the image as to gender, age, emotion, and the like.

At block 504, a confidence level is determined for each of the subject categories. The confidence level may be a weighted average of a predetermined number of analyses. For example, the analysis may be repeated for 5, 10, or any number of images wherein the confidence level calculated for each category for each image is averaged, and later images are weighted more heavily than earlier images.

At block 506, the confidence level is compared to a user defined threshold. As described herein, the threshold may be set based on the importance of the measurement. For example, for the analysis of the image of a viewer looking at a sign, response speed may be more important than accuracy. In this example, the threshold may be set to about 50%, 60%, 70%, or higher. As another example, confirmation of a user's identity for security purposes, such as using a facial recognition algorithm, may use a much higher threshold, such as about 90%, 95%, or higher, which may be determined by the presence of other credentials. If it is determined at block 506 confidence level is greater than the threshold, process flow proceeds to block 508 and no further action is taken to modify the model. Actuation based on the results determined from the classification at the edge server is taken, for example, displaying new information on a sign based on the gender or emotion of a viewer.

If at block 506 it is determined that the confidence level is not greater than the threshold, then process flow proceeds to block 510. At block 510, the sensor data is sent to a cloud server hosting an analytics engine for re-disposition. The sensor data may be associated with a unique identification, and buffered at the edge server for later use.

At block 512, the analytics engine hosted by the cloud server determines a reclassification of the data. For example, the analytics engine may use a more accurate model to determine the age, gender, or emotion of a viewer of a sign.

As part of the reclassification, the analytics engine may determine a confidence level for the reclassified data.

At block 514, a determination is made as to whether the confidence level is greater than a user defined cloud threshold. If not, at block 516, no further action is taken by the cloud server, and the data is deleted. After a after a delay time, in the absence of receipt of a reclassification result from the cloud server, the edge server may also delete the data.

If at block 514, it is determined that the confidence level is greater than the cloud threshold, process flow proceeds to block 518. At block 518 the cloud server sends the reclassification results back to the edge server. The cloud server may also send the unique identification back to the edge server, in place of returning the data to the edge server.

At block 520, the edge server hosted analytics engine acts on the results returned from the cloud server. This may include an actuation, such as changing the content on an advertising display, or active sign, based on the reclassified results received from the cloud server. Further, the analytics engine hosted by the edge server may use the sensor data and reclassification results to retrain its prediction algorithm using a machine learning technique.

Figure 6:
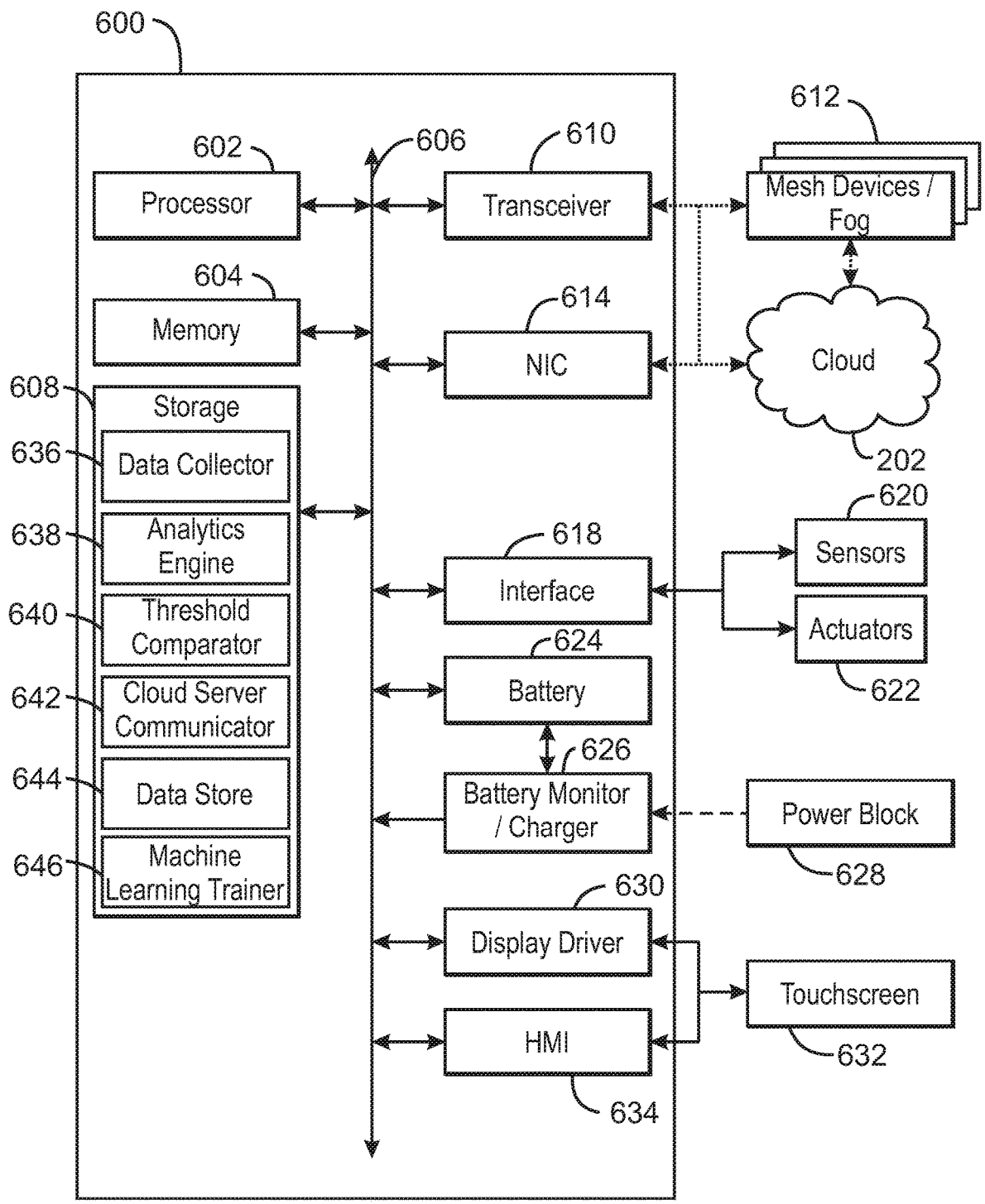
FIG. 6 is a block diagram of an example of components that may be present in an IoT device including an analytics engine that may be trained by an analytics engine in a cloud server in accordance with some embodiments.

FIG. 6 is a block diagram of an example of components that may be present in an edge server 600 including an analytics engine that may be trained by an analytics engine in a cloud server in accordance with some embodiments. Like numbered items are as described with respect to FIG. 2. The edge server 600 may include any combinations of the components shown in the example. The components may be implemented as ICs, portions thereof, discrete electronic devices, or other modules, logic, hardware, software, firmware, or a combination thereof adapted in the edge server 600, or as components otherwise incorporated within a chassis of a larger system. The block diagram of FIG. 6 is intended to show a high-level view of components of the edge server 600. However, some of the components shown may be omitted, additional components may be present, and different arrangement of the components shown may occur in other devices.

The edge server 600 may include a processor 602, which may be a microprocessor, a multi-core processor, a multi-threaded processor, an ultra-low voltage processor, an embedded processor, or other known processing element. The processor 602 may be a part of a system on a chip (SoC) in which the processor 602 and other components are formed into a single integrated circuit, or a single package, such as the Edison™ or Galileo™ SoC boards from Intel. As an example, the processor 602 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc. The processor 602 may include a graphics processing unit (GPU) or a floating-point gate array (FPGA) in addition to, or instead of, the processors described herein.

The processor 602 may communicate with a system memory 604 over a bus 606. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations, the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 608 may also be coupled to the processor 602 via the bus 606. To enable a thinner and lighter system design, the mass storage 608 may be implemented via a solid-state drive (SSD). Other devices that may be used for the mass storage 608 include flash memory cards, such as SD cards, microSD cards, xD picture cards, and the like, and USB flash drives.

In low power implementations, the mass storage 608 may be on-die memory or registers associated with the processor 602. However, in some examples, the mass storage 608 may be implemented using a micro hard disk drive (HDD). Further, any number of new technologies may be used for the mass storage 608 in addition to, or instead of, the technologies described, such resistance change memories, phase change memories, holographic memories, or chemical memories, among others. For example, the edge server 600 may incorporate the 3D XPOINT memories from Intel® and Micron®.

The components may communicate over the bus 606. The bus 606 may include any number of technologies in any combinations, for example, including industry standard architecture (ISA), extended ISA (EISA), peripheral component interconnect (PCI), peripheral component interconnect extended (PCIx), PCI express (PCIe), or any number of other technologies. The bus 606 may be a proprietary bus, for example, used in a SoC based system. Other bus systems may be included, such as an I$^2$C interface, I$^3$C interface, an SPI interface, point to point interfaces, and a power bus, among others.

The bus 606 may couple the processor 602 to a transceiver 610, for communications with other devices 612, or with devices in the cloud 202, or both. The transceiver 610 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a wireless communication protocol, may be included for the connections to the devices 612 or cloud 202. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via a WWAN unit.

The transceiver 610 may communicate using multiple standards or radios for communications at different range. For example, the edge server 600 may communicate with geographically proximate devices, e.g., within about 10 meters, using a local transceiver based on BLE, or another low power radio, to save power. More distant devices 612, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee. The transceiver 610 may be incorporated into an MCU as an address directly accessible by the chip, such as in the Curie® units available from Intel.

The transceiver 610 may include radios to communicate with devices in the cloud 202, for example, an LPWA transceiver that follows the IEEE 802.15.4, IEEE 802.15.4g, IEEE 802.15.4e, IEEE 802.15.4k, or NB-IoT standards, among others. The edge server 600 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the transceiver 610. For example, the transceiver 610 may include an LTE or other cellular transceiver that uses spread spectrum (SPA/SAS) communications for implementing high-speed communications, such as for video transfers. Further, any number of other protocols may be used, such as Wi-Fi® networks for medium speed communications, such as still pictures, sensor readings, and provision of network communications.

The transceiver 610 may include radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), or Narrow Band IoT (NB-IoT), among others. It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High-speed Packet Access), HSDPA (High-Speed Downlink Packet Access), HSUPA (High-Speed Uplink Packet Access), HSPA+ (High-speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used in the transceiver 610, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 614 may be included to provide a wired communication to the cloud 202 or to other devices, such as the devices 612 in a mesh or local IoT network. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC may be included to allow connect to a second network, for example, the NIC 616 providing communications to the cloud over Ethernet, and a second NIC providing communications to other devices over another type of network.

The bus 606 may couple the processor 602 to an interface 618 that is used to connect external devices. The external devices may include sensors 620, such as cameras, motion sensors, accelerometers, level sensors, flow sensors, temperature sensors, pressure sensors, barometric pressure sensors, and the like. The interface 618 may be used to connect the edge server 600 to actuators 622, such as signs, power switches, valve actuators, an audible sound generator, a visual warning device, and the like.

A battery 624 may power the edge server 600, although in examples in which the edge server 600 is mounted in a fixed location, it may have a power supply coupled to an electrical grid. The battery 624 may be a lithium ion battery, a metal-air battery, such as a zinc-air battery, an aluminum-air battery, a lithium-air battery, a hybrid super-capacitor, and the like. Any number of other technologies may be used for the battery 624 instead of, or in addition to, the technologies described herein, including, for example, lead acid batteries, gel cell batteries, nickel cadmium batteries, rechargeable zinc batteries, and the like.

A battery monitor/charger 626 may be included in the edge server 600 to track the state of charge (SoCh) of the battery 624. The battery monitor/charger 626 may be used to monitor other parameters of the battery 624 to provide failure predictions, such as the state of health (SoH) and the state of function (SoF) of the battery 624. The battery monitor/charger 626 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 626 may communicate the information on the battery 624 to the processor 602 over the bus 606. The battery monitor/charger 626 may also include an analog-to-digital (ADC) convertor that allows the processor 602 to directly monitor the voltage of the battery 624 or the current flow from the battery 624. The battery parameters may be used to determine actions that the edge server 600 may perform, such as transmission frequency, mesh network operation, sensing frequency, and the like.

A power block 628, or other power supply coupled to a grid, may be coupled with the battery monitor/charger 626 to charge the battery 624. In some examples, the power block 628 may be replaced with a wireless power receiver to obtain the power wirelessly, for example, through a loop antenna in the edge server 600. A wireless battery charging circuit, such as an LTC4020 chip from Linear Technologies of Milpitas, Calif., among others, may be included in the battery monitor/charger 626. The specific charging circuits chosen depend on the size of the battery 624, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others. In some examples, the power block 628 may be augmented or replaced with solar panels, a wind generator, a water generator, or other natural power systems.

Various input/output (I/O) devices may be present within, or connected to, the edge server 600. For example, a display driver 630 may be coupled to the processor 602 through the bus 606. The display driver 630 may power a display, for example, as part of a display/touchscreen 632. A human-machine interface (HMI) 634 may interface with the touch-screen portion of the display/touchscreen 632 to obtain input. Any number of other display devices may be used including monitors, flat screen displays, LEDs, CRTs, and the like. Similarly, any number of other input devices may be used including keyboards, mice, trackballs, and the like. The display may be included to show information, such as advertisements, sensor readings, actuator positions, configuration and troubleshooting data, and the like. The input devices may allow the entry of viewer requests, setpoints, configuration information, and other information that be useful for the deployment. Further, data may be displayed on devices or systems that are not part of the systems network or the trusted network. Data of any kind may be displayed on the IoT display, management displays attached to the IoT system, or other displays after appropriate credentials are entered. These may include, for example, user data, system operator data, intermediate data, stored data, and the like. A display the data to support deployment or user interaction to verify or confirm data entry may be provided.

The mass storage 608 may include a number of modules to implement the group creation functions described herein. Although shown as code blocks in the mass storage 608, it may be understood that any of the modules may be fully or partially replaced with hardwired circuits, for example, built into an application specific integrated circuit (ASIC). The mass storage 608 may include a data collector 636 to obtain data from the sensors 620, the HMI 634, or both. An analytics engine 638 may be included to classify the data, generate predictions from the data, or both. The analytics engine 638 may calculate a confidence level for the classification or predictions. The confidence level may be a weighted average of a number of classifications or predictions from the same data. A threshold comparator 640 may compare the confidence level to a preset threshold, for example, to determine if the classification or prediction is of sufficient quality for actuation. A cloud server communicator 642 may be used to request an analytics engine hosted by a cloud server to reclassify data that does not meet the threshold.

The cloud server communicator 642 may send the data to the cloud server. In some examples, a unique identification code for the data may be sent to the cloud server as well. The unique identification code may be associated with a data store 644 that temporarily holds the data sent to the cloud server.

Upon receiving a communication back from the cloud server that includes a reclassification, a machine learning trainer 646 may be used to improve the accuracy of the model used by the analytics engine 638 through a supervised learning process using the data and the reclassification from the cloud server. If an identification code was sent to the cloud server along with the data, the cloud server may return the identification code and the reclassification without sending the data back. The identification code may then be used by the edge server 600 to access the associated data in the data store 644.

Figure 7:
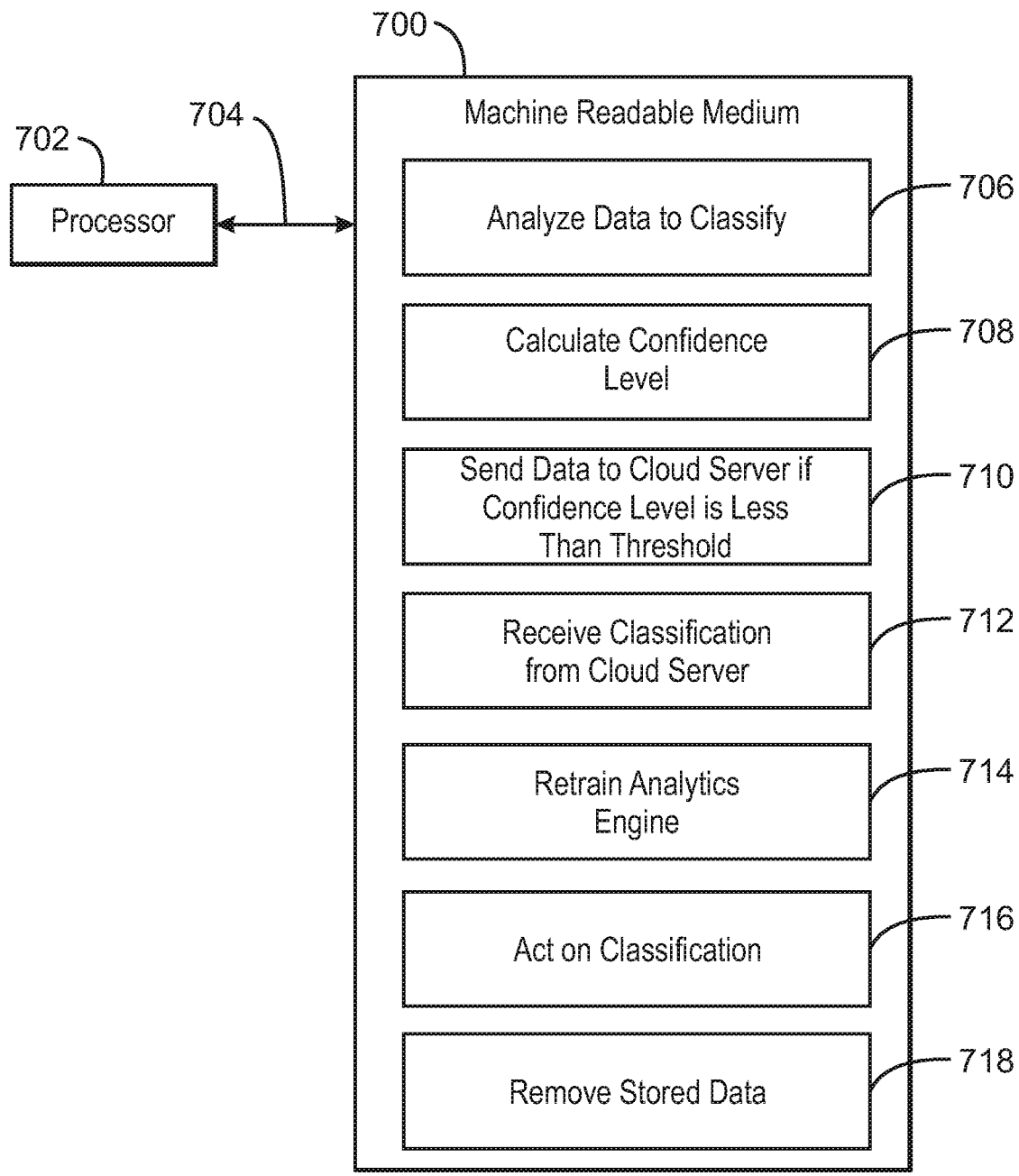
FIG. 7 is a block diagram of an exemplary non-transitory, machine readable medium including code to direct a processor to access a cloud server for training in accordance with some embodiments.

FIG. 7 is a block diagram of an exemplary non-transitory, machine readable medium 700 including code to direct a processor 702 to access a cloud server for training in accordance with some embodiments. The processor 702 may access the non-transitory, machine readable medium 700 over a bus 704. The processor 702 and bus 704 may be selected as described with respect to the processor 602 and bus 606 of FIG. 6. The non-transitory, machine readable medium 700 may include devices described for the mass storage 608 of FIG. 6, or may include optical disks, thumb drives, or any number of other hardware devices.

As described herein, the non-transitory, machine readable medium 700 may include code 706 to direct the processor 702 to analyze data from a sensor to determine a classification or a prediction. Code 708 may be included to direct the processor 702 to calculate a confidence level for the prediction. Code 710 may be included to direct the processor 702 to send the data to a cloud server for analysis by an analytics engine hosted by the cloud server. The code 710 may direct the processor 702 to create a unique identification code for the data to be sent to the cloud server along with the data.

The machine readable medium 700 may include code 712 to direct the processor 702 to receive a classification or prediction from a cloud server. The code 712 may use the identification code sent to the cloud server with the data to retrieve the data from a data store or buffer. Code 714 may be included to direct the processor 702 to use the classification or prediction from the cloud server, along with the data, to retrain the model used by the analytics engine hosted by the edge server in a supervised learning. Code 716 may be included to direct the processor 702 to act on the classification or prediction, for example, changing the content of a sign based on a viewer, controlling traffic lights, changing process parameters in a plant, and the like. Code 718 may be included to direct the processor 702 to remove stored data that is no longer needed, for example, once training is complete or after a delay period with no response from the cloud server.

EXAMPLES

Example 1 includes a compute system, including an edge server. The edge server includes an analytics engine to analyze data from a sensor, wherein the analytics engine determines a confidence level for an analysis result. A threshold comparator is included to compare the confidence level to a threshold. A cloud server communicator sends the data to a cloud server for processing if the confidence level is less than the threshold. A machine learning trainer trains the analytics engine based, at least in part, on a result received from the cloud server and the data. In some examples, the edge server may be part of a fog device.

Example 2 includes the subject matter of example 1. In this example, the cloud server communicator generates a unique identification code for the data, which is sent to the cloud server along with the data.

Example 3 includes the subject matter of either of examples 1 or 2. In this example, the cloud server communicator stores the data sent to the cloud server in a data store, and associates the data in the data store with a unique identification code.

Example 4 includes the subject matter of any of examples 1 to 3. In this example, the machine learning trainer accesses the data in a data store using a unique identification code returned from the cloud server with the result.

Example 5 includes the subject matter of any of examples 1 to 4. In this example, the edge server includes a data collector to collect the data from the sensor.

Example 6 includes the subject matter of any of examples 1 to 5. In this example, the analysis result includes a classification of the data, a prediction from the data, or both.

Example 7 includes the subject matter of any of examples 1 to 6. In this example, the compute system includes a lower threshold, wherein if the confidence level is less than the lower threshold the data is discarded.

Example 8 includes the subject matter of any of examples 1 to 7. In this example, the compute system includes a camera to collect an image of a viewer, wherein the image is the data.

Example 9 includes the subject matter of any of examples 1 to 8. In this example, the compute system includes a display to display content based, at least in part, on the analysis result.

Example 10 includes the subject matter of any of examples 1 to 9. In this example, the compute system includes the cloud server, wherein the cloud server includes a cloud analytics engine.

Example 11 includes the subject matter of any of examples 1 to 10. In this example, a cloud analytics engine generates a reclassification confidence level for the result.

Example 12 includes the subject matter of any of examples 1 to 11. In this example, a cloud analytics engine discards the data if the reclassification confidence level is less than a cloud threshold.

Example 13 includes the subject matter of any of examples 1 to 12. In this example, the edge server includes an anonymous video analyzer (AVA).

Example 14 includes the subject matter of any of examples 1 to 13. In this example, the compute system includes an Internet of things (IoT) device in communication with the edge server, wherein the IoT device includes an IoT analytics engine to analyze data from an IoT sensor coupled to the IoT device, and to determine an IoT confidence level for an IoT analysis result. An IoT threshold comparator compares the IoT confidence level to an IoT threshold, an edge server communicator sends the data to the edge server for processing if the IoT confidence level is less than the IoT threshold. An IoT machine learning trainer trains the IoT analytics engine based, at least in part, on a reclassification received from the edge server and the data.

Example 15 includes a method for training an analytics engine hosted by an edge server, including determining a classification for data in an analytics engine hosted by the edge server, and computing a confidence level for the classification. The confidence level is compared to a threshold, and the data is sent to a cloud server if the confidence level is less than the threshold. A reclassification is received from the cloud server, and the analytics engine hosted by the edge server is trained based, at least in part, on the data and the reclassification.

Example 16 includes the subject matter of example 15. In this example, computing the confidence level includes generating a weighted average of a plurality of individual confidence levels calculated for different data sets.

Example 17 includes the subject matter of either of examples 15 or 16. In this example, the method includes creating a unique identification code for the data, storing a local copy of the data associated with the unique identification code, and sending the unique identification code with the data to the cloud server.

Example 18 includes the subject matter of any of examples 15 to 17. In this example, the method includes receiving a unique identification code with the reclassification from the cloud server.

Example 19 includes the subject matter of any of examples 15 to 18. In this example, the method includes accessing a local copy of the data associated with a unique identification code, and providing the local copy of the data and the reclassification to the analytics engine for training.

Example 20 includes the subject matter of any of examples 15 to 19. In this example, the method includes storing a local copy of the data in the edge server for a delay period, and deleting the local copy if the reclassification is not received from the cloud server before an expiration of the delay period.

Example 21 includes the subject matter of any of examples 15 to 20. In this example, the method includes receiving the data from a client device in a local network including the edge server.

Example 22 includes the subject matter of any of examples 15 to 21. In this example, the method includes collecting the data from a sensor operated by the edge server.

Example 23 includes the subject matter of any of examples 15 to 22. In this example, determining the classification includes analyzing an image to determine an age, a gender, an emotion, a face expression, a face landmark, a hand landmark, a body landmark, a demographic classification, a face pose, a body pose, a gesture, a gaze direction, a scene classification, a person identification, an object identification, or any combinations thereof.

Example 24 includes the subject matter of any of examples 15 to 23. In this example, the method includes changing a content of an active sign based, at least in part, on a classification.

Example 25 includes the subject matter of any of examples 15 to 24. In this example, determining the classification includes generating a prediction from the data.

Example 26 includes the subject matter of any of examples 15 to 25. In this example, the method includes performing an action based, at least in part, on a prediction.

Example 27 includes a non-transitory, machine readable medium including code that, when executed, directs a processor to analyze data to determine a classification for the data. Code is included, that, when executed, directs the processor to calculate a confidence level for the data, and send the data to a cloud server for reclassification if the confidence level is less than a threshold. Code is included, that, when executed, directs the processor to retrain a model based, at least in part, on the reclassification received from the cloud server and the data.

Example 28 includes the subject matter of example 27. In this example, the non-transitory, machine readable medium includes code that, when executed, directs the processor to generate a unique identification code for the data, and store the data in a local data store. The code, when executed, directs the processor to associate the data in the local data store with the unique identification code, and send the unique identification code to the cloud server with the data.

Example 29 includes the subject matter of either of examples 27 or 28. In this example, the non-transitory, machine readable medium includes code that, when executed, directs the processor to act on the classification.

Example 30 includes the subject matter of any of examples 27 to 29. In this example, the non-transitory, machine readable medium includes code that, when executed, directs the processor to remove data from a local data store if a reclassification result is not received from the cloud server within a delay period.

Example 31 includes the subject matter of any of examples 27 to 30. In this example, the non-transitory, machine readable medium includes code that, when executed, directs the processor to collect the data from a sensor.

Example 32 includes the subject matter of any of examples 27 to 31. In this example, the non-transitory, machine readable medium includes code that, when executed, directs the processor to obtain the data from a client device over a network.

Example 33 includes a compute system, including an edge server. The edge server includes an analytics engine to analyze data from a sensor, wherein the analytics engine determines a confidence level for an analysis result, a threshold comparator to compare the confidence level to a threshold, and a cloud server communicator to send the data to a cloud server for processing if the confidence level is less than the threshold. The edge server includes a means to train the analytics engine based, at least in part, on a result received from the cloud server and the data.

Example 34 includes the subject matter of example 33. In this example, the compute system includes a means to access data using a unique identification code returned from the cloud server with the result.

Example 35 includes the subject matter of either of examples 33 or 34. In this example, the edge server includes a means to collect data.

Example 36 includes the subject matter of any of examples 33 to 35. In this example, the compute system includes a means to obtain an image to be used as the data.

Example 37 includes the subject matter of any of examples 33 to 36. In this example, the cloud server includes a means to generate reclassify data and send a result to the edge server.

Example 38 includes the subject matter of any of examples 33 to 37. In this example, the compute system includes an Internet of things (IoT) device in communication with the edge server, wherein the IoT device includes a means to classify data from a sensor and to determine an IoT confidence level, an IoT threshold comparator to compare the IoT confidence level to an IoT threshold, an edge server communicator to send the data to the edge server for processing if the IoT confidence level is less than the IoT threshold, and an IoT machine learning trainer to train the IoT analytics engine based, at least in part, on a reclassification received from the edge server and the data.

Example 39 includes a non-transitory, machine readable medium including code that, when executed, directs a processor to perform any one of the methods of examples 33 to 38.

Example 40 includes an apparatus, including means to perform any one of the methods of examples 33 to 39.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. A compute system, comprising an edge server comprising:
a processor; and
storage to store instructions to direct the processor to:
analyze data from one or more sensor to predict one or more events based on the data;
determine a first confidence level for a first analysis result relating to the predicted one or more events;
disposition the analyzed data based on subject categories;
assign a confidence level to the dispositioned data for each subject category;
compute the first confidence level based on the assigned confidence levels;
compare the first confidence level to a first threshold;
send the data to a cloud server for processing if the first confidence level is less than the first threshold;
receive a second analysis result from the cloud server, wherein the second analysis result has a second confidence level greater than a second threshold; and
train the predicting of the one or more events based, at least in part, on the second analysis result.

2. The compute system of claim 1, comprising a fog device comprising the edge server, wherein the fog device comprises a plurality of Internet of things (IoT) devices.

3. The compute system of claim 1, wherein the storage to store instructions to direct the processor to:
generate a unique identification code for the data; and
send the unique identification code to the cloud server.

4. The compute system of claim 1, wherein the storage to store instructions to direct the processor to:
store the data sent to the cloud server in a data store; and
associate the data in the data store with a unique identification code.

5. The compute system of claim 1, wherein the storage to store instructions to direct the processor to:
access the data in a data store using a unique identification code returned from the cloud server.

6. The compute system of claim 1, wherein the first analysis result, the second analysis result, or both the first analysis result and the second analysis result includes a classification of the data.

7. The compute system of claim 1, comprising a lower threshold, wherein if the first confidence level is less than the lower threshold the data is discarded.

8. The compute system of claim 1, comprising a display to display content based, at least in part, on the first analysis result, the second analysis result, or both the first analysis result and the second analysis result.

9. The compute system of claim 1, comprising the cloud server, wherein the cloud server to implement cloud analytics.

10. The compute system of claim 9, wherein the cloud analytics to generate a reclassification confidence level for the second analysis result.

11. The compute system of claim 10, wherein the cloud analytics to discard the data if the reclassification confidence level is less than a cloud threshold.

12. The compute system of claim 1, wherein the edge server comprises an anonymous video analyzer (AVA).

13. The compute system of claim 1, comprising an Internet of things (IoT) device in communication with the edge server, wherein the IoT device comprises:
a processor; and
storage to store instructions to direct the processor to:
analyze data from an IoT sensor coupled to the IoT device to predict one or more IoT sensor events based on the data;
determine an IoT confidence level for an IoT analysis result relating to the predicted one or more IoT sensor events;
compare the IoT confidence level to an IoT threshold;
send the data to the edge server for processing if the IoT confidence level is less than the IoT threshold; and
train the predicting of the one or more IoT sensor events based, at least in part, on a reclassification received from the edge server and the data.

14. The compute system of claim 1, wherein the first confidence level comprises a weighted average confidence level of a user defined subset of the assigned confidence levels.

15. The compute system of claim 1, wherein the first threshold is the same as the second threshold.

16. The compute system of claim 1, wherein the second threshold is higher than the first threshold.

17. A method for training analytics analysis hosted by an edge server, comprising:
determining a classification for data from one or more sensor to predict one or more events based on the data;
computing a first confidence level for the classification relating to the predicted one or more events;
dispositioning the data based on subject categories;
assigning a confidence level to the dispositioned data for each subject category;
computing the first confidence level based on the assigned confidence levels;
comparing the first confidence level to a first threshold;
sending the data to a cloud server if the first confidence level is less than the first threshold;
receiving a reclassification from the cloud server, wherein the reclassification has a second confidence level greater than a second threshold; and
training the predicting of the one or more events based, at least in part, on the reclassification.

18. The method of claim 17, wherein computing the confidence level comprises generating a weighted average of a plurality of individual confidence levels calculated for different data sets.

19. The method of claim 17, comprising:
creating a unique identification code for the data;
storing a local copy of the data associated with the unique identification code; and
sending the unique identification code with the data to the cloud server.

20. The method of claim 17, comprising receiving a unique identification code with the reclassification from the cloud server.

21. The method of claim 20, comprising:
accessing a local copy of the data associated with the unique identification code; and
providing the local copy of the data and the reclassification to the analytics engine for training.

22. The method of claim 17, comprising:
storing a local copy of the data in the edge server for a delay period; and
deleting the local copy if the reclassification is not received from the cloud server before an expiration of the delay period.

23. The method of claim 17, wherein determining the classification comprises analyzing an image to determine an age, a gender, an emotion, a face expression, a face landmark, a hand landmark, a body landmark, a demographic classification, a face pose, a body pose, a gesture, a gaze direction, a scene classification, a person identification, an object identification, or any combinations thereof.

24. The method of claim 23, comprising changing a content of an active sign based, at least in part, on the classification.

25. The method of claim 17, wherein determining the classification comprises generating a prediction from the data.

26. The method of claim 17, wherein the first confidence level comprises a weighted average confidence level of a user defined subset of the assigned confidence levels.

27. The method of claim 17, wherein the first threshold is the same as the second threshold.

28. The method of claim 17, wherein the second threshold is higher than the first threshold.

29. A non-transitory, machine readable medium, comprising code that, when executed, directs a processor to:
analyze data to determine a classification for data from one or more sensor to predict one or more events based on the data;
calculate a first confidence level for an analysis result relating to the predicted one or more events;
disposition the analyzed data based on subject categories;
assign a confidence level to the dispositioned data for each subject category;
compute the first confidence level based on the assigned confidence levels;
send the data to a cloud server for reclassification if the first confidence level is less than a first threshold;
receive a reclassification from the cloud server, wherein the reclassification has a second confidence level greater than a second threshold; and
retrain the predicting of the one or more events based, at least in part, on the reclassification received from the cloud server.

30. The non-transitory, machine readable medium of claim 29, comprising code that, when executed, directs the processor to:
generate a unique identification code for the data;
store the data in a local data store;
associate the data in the local data store with the unique identification code; and
send the unique identification code to the cloud server with the data.

31. The non-transitory, machine readable medium of claim 29, comprising code that, when executed, directs the processor to act on the classification.

32. The non-transitory, machine readable medium of claim 29, comprising code that, when executed, directs the processor to remove data from a local data store if a reclassification result is not received from the cloud server within a delay period.

33. The non-transitory, machine readable medium of claim 29, wherein the first confidence level comprises a weighted average confidence level of a user defined subset of the assigned confidence levels.

34. The non-transitory, machine readable medium of claim 29, wherein the first threshold is the same as the second threshold.

35. The non-transitory, machine readable medium of claim 29, wherein the second threshold is higher than the first threshold.

* * * * *